US011538316B2

(12) United States Patent
Lee et al.

(10) Patent No.: US 11,538,316 B2
(45) Date of Patent: Dec. 27, 2022

(54) SURVEILLANCE SYSTEM AND CONTROL METHOD THEREOF

(71) Applicant: HANWHA TECHWIN CO., LTD., Seongnam-si (KR)

(72) Inventors: Joon Sung Lee, Seongnam-si (KR); Ho Woong Lee, Seongnam-si (KR); Min Suk Sung, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/082,498

(22) PCT Filed: Aug. 11, 2016

(86) PCT No.: PCT/KR2016/008832
§ 371 (c)(1),
(2) Date: Sep. 5, 2018

(87) PCT Pub. No.: WO2017/175924
PCT Pub. Date: Oct. 12, 2017

(65) Prior Publication Data
US 2019/0080575 A1 Mar. 14, 2019

(30) Foreign Application Priority Data
Apr. 7, 2016 (KR) .................. 10-2016-0042798

(51) Int. Cl.
*G08B 13/196* (2006.01)
*G08B 29/18* (2006.01)
(Continued)

(52) U.S. Cl.
CPC . *G08B 13/19608* (2013.01); *G08B 13/19645* (2013.01); *G08B 13/19667* (2013.01);
(Continued)

(58) Field of Classification Search
CPC ........ G08B 13/19608; G08B 13/19645; G08B 29/181; G08B 13/19667; H04N 5/23299; H04N 5/232411; H04N 7/181
See application file for complete search history.

(56) References Cited

U.S. PATENT DOCUMENTS 6,041,361 A * 3/2000 Wilson ............. G08B 13/19604
709/253
8,780,201 B1 * 7/2014 Scalisi .................. H04N 7/186
348/143
(Continued)

FOREIGN PATENT DOCUMENTS

KR  10-2007-0071267    7/2007
KR     10-0866482    11/2008
(Continued)

OTHER PUBLICATIONS

International Search Report dated Dec. 19, 2016, in International Patent Application No. PCT/KR2016/008832.
(Continued)

*Primary Examiner* — Ricky Chin
(74) *Attorney, Agent, or Firm* — Sughrue Mion, PLLC

(57) ABSTRACT

A gateway of a surveillance system, the gateway includes: a communication module configured to communicate with a plurality of network cameras including a first network camera and a second network camera; and a processor configured to recognize a motion of a subject based on event information transmitted by the first network camera and to transmit subject information generated based on the motion of the subject to the second network camera.

5 Claims, 6 Drawing Sheets

(51) Int. Cl.
*H04N 5/232* (2006.01)
*H04N 7/18* (2006.01)

(52) U.S. Cl.
CPC ....... *G08B 29/181* (2013.01); *H04N 5/23299* (2018.08); *H04N 5/232411* (2018.08); *H04N 7/181* (2013.01)

(56) References Cited

U.S. PATENT DOCUMENTS

| | | | | |
|---|---|---|---|---|
| 9,392,099 | B2* | 7/2016 | Lim | H04M 1/72538 |
| 9,560,323 | B2* | 1/2017 | Huang | G06K 9/6267 |
| 10,318,836 | B2* | 6/2019 | Burke | G06K 9/3233 |
| 2003/0044168 | A1* | 3/2003 | Matsukawa | G08B 13/19641 |
| | | | | 386/223 |
| 2003/0095688 | A1* | 5/2003 | Kirmuss | G08B 13/19647 |
| | | | | 382/105 |
| 2003/0193571 | A1* | 10/2003 | Schultz | H04N 5/225 |
| | | | | 348/207.99 |
| 2004/0086091 | A1* | 5/2004 | Naidoo | G08B 13/19669 |
| | | | | 379/37 |
| 2004/0105450 | A1* | 6/2004 | Ikuta | H04L 29/06 |
| | | | | 370/401 |
| 2004/0179100 | A1* | 9/2004 | Ueyama | H04N 7/183 |
| | | | | 348/152 |
| 2004/0212678 | A1* | 10/2004 | Cooper | G08B 13/19695 |
| | | | | 348/155 |
| 2004/0240546 | A1* | 12/2004 | Wells | H04N 7/181 |
| | | | | 375/240.12 |
| 2005/0160308 | A1* | 7/2005 | Elcock | H04N 21/43622 |
| | | | | 714/5.1 |
| 2005/0169546 | A1* | 8/2005 | Shin | H04N 19/615 |
| | | | | 382/239 |
| 2006/0078047 | A1* | 4/2006 | Shu | H04N 21/2187 |
| | | | | 375/240.01 |
| 2006/0140452 | A1* | 6/2006 | Raynor | G06F 1/3203 |
| | | | | 382/115 |
| 2006/0203101 | A1* | 9/2006 | Silsby | H04N 5/23293 |
| | | | | 348/222.1 |
| 2007/0001836 | A1* | 1/2007 | Singer | G08B 13/1966 |
| | | | | 340/528 |
| 2007/0115351 | A1* | 5/2007 | McCormack | H04N 5/23238 |
| | | | | 348/36 |
| 2007/0139536 | A1* | 6/2007 | Watanabe | H04N 19/107 |
| | | | | 348/231.99 |
| 2007/0236570 | A1* | 10/2007 | Sun | H04N 17/002 |
| | | | | 348/169 |
| 2008/0036860 | A1* | 2/2008 | Addy | G08B 13/19652 |
| | | | | 348/143 |
| 2008/0084473 | A1* | 4/2008 | Romanowich | G08B 13/19671 |
| | | | | 348/135 |
| 2009/0135007 | A1* | 5/2009 | Donovan | G08B 13/19645 |
| | | | | 340/540 |
| 2009/0141939 | A1* | 6/2009 | Chambers | G08B 13/19613 |
| | | | | 382/103 |
| 2009/0151769 | A1* | 6/2009 | Corbin | H02S 40/22 |
| | | | | 136/246 |
| 2009/0309973 | A1* | 12/2009 | Kogane | H04N 7/181 |
| | | | | 348/159 |
| 2010/0002070 | A1* | 1/2010 | Ahiska | H04N 7/181 |
| | | | | 348/36 |
| 2010/0002071 | A1* | 1/2010 | Ahiska | H04N 5/23216 |
| | | | | 348/36 |
| 2010/0079623 | A1* | 4/2010 | Tomita | H04N 5/23296 |
| | | | | 348/240.99 |
| 2010/0141767 | A1* | 6/2010 | Mohanty | G08B 13/19643 |
| | | | | 348/E5.024 |
| 2010/0157064 | A1* | 6/2010 | Cheng | G06K 9/00771 |
| | | | | 348/169 |
| 2011/0217681 | A1* | 9/2011 | Krejcarek | G06F 19/3481 |
| | | | | 434/236 |
| 2011/0255777 | A1* | 10/2011 | Matsuoka | H04N 1/4092 |
| | | | | 382/164 |
| 2013/0208113 | A1* | 8/2013 | Yoneji | G08B 13/19608 |
| | | | | 348/143 |
| 2013/0250047 | A1* | 9/2013 | Hollinger | H04N 5/2252 |
| | | | | 348/36 |
| 2014/0015981 | A1* | 1/2014 | Dietl | H04N 5/2251 |
| | | | | 348/159 |
| 2014/0085480 | A1* | 3/2014 | Saptharishi | G06F 16/71 |
| | | | | 348/159 |
| 2014/0139631 | A1* | 5/2014 | Mark | G06F 3/017 |
| | | | | 348/46 |
| 2014/0192206 | A1* | 7/2014 | Holz | H04N 5/23218 |
| | | | | 348/169 |
| 2014/0333775 | A1* | 11/2014 | Naikal | H04N 7/181 |
| | | | | 348/159 |
| 2015/0002666 | A1* | 1/2015 | Yang | H04N 5/23245 |
| | | | | 348/143 |
| 2015/0222798 | A1* | 8/2015 | Fuchikami | G06K 9/00624 |
| | | | | 348/135 |
| 2015/0341603 | A1* | 11/2015 | Kasmir | H04M 1/0291 |
| | | | | 348/143 |
| 2016/0080652 | A1* | 3/2016 | Shirota | G06F 21/83 |
| | | | | 348/222.1 |
| 2016/0094814 | A1* | 3/2016 | Gousev | G06K 9/6267 |
| | | | | 348/143 |
| 2016/0189500 | A1* | 6/2016 | Kim | H04W 4/70 |
| | | | | 386/223 |
| 2016/0247027 | A1* | 8/2016 | Tsoi | G08B 13/196 |
| 2016/0269621 | A1* | 9/2016 | Cho | H04N 5/232411 |
| 2016/0285952 | A1* | 9/2016 | Panigrahi | H04L 67/2828 |
| 2016/0360105 | A1* | 12/2016 | Huang | H04N 5/232411 |
| 2017/0127302 | A1* | 5/2017 | Fersman | H04W 84/20 |
| 2017/0372573 | A1* | 12/2017 | Park | G08B 27/005 |
| 2018/0241922 | A1* | 8/2018 | Baldwin | H04N 5/23241 |
| 2018/0270763 | A1* | 9/2018 | Lee | H04N 7/181 |
| 2019/0068881 | A1* | 2/2019 | Kim | H04N 5/23245 |
| 2019/0080575 | A1* | 3/2019 | Lee | H04N 5/23299 |
| 2019/0104283 | A1* | 4/2019 | Wakeyama | G08B 13/19608 |
| 2019/0191085 | A1* | 6/2019 | Chang | G01S 11/00 |
| 2020/0381507 | A1 | 12/2020 | Park et al. | |

FOREIGN PATENT DOCUMENTS

| | | |
|---|---|---|
| KR | 10-0880901 | 2/2009 |
| KR | 10-2009-0064675 | 6/2009 |
| KR | 10-2010-0073671 | 7/2010 |
| KR | 10-2010-0114748 | 10/2010 |
| KR | 10-0999559 | 12/2010 |
| KR | 10-2011-0111883 | 10/2011 |
| KR | 10-2013-0125552 | 11/2013 |
| KR | 2014-0058192 | 5/2014 |
| KR | 10-2015-0022673 | 3/2015 |
| WO | 2005/074289 | 8/2005 |
| WO | 2015/026203 | 2/2015 |

OTHER PUBLICATIONS

Written Opinion dated Dec. 19, 2016, in International Patent Application No. PCT/KR2016/008832.

Office Action dated Mar. 29, 2022 from the Korean Patent Office for Korean Patent Application No. 10-2016-0042798.

* cited by examiner

FIG. 5

| OPERATION MODE | EVENT SENSING PERIOD (MILLISECOND) | FRAME RATE | IMAGE COMPRESSION RATIO | OPERATION |
|---|---|---|---|---|
| SLEEP MODE | 250 | - | - | EVENT SENSING ALARM |
| ACTIVE MODE | - | FULL | LOW COMPRESSION MODE (YUV 4:2:2) | HIGH-DEFINITION IMAGE ACQUISITION |
| STANDBY MODE | 10 | HALF | HIGH COMPRESSION MODE (YUV 4:0:0) | EVENT SENSING ALARM, LOW-QUALITY IMAGE ACQUISITION |

SURVEILLANCE SYSTEM AND CONTROL METHOD THEREOF

CROSS-REFERENCE TO RELATED APPLICATION

This application is the National Stage Entry of International Patent Application No. PCT/KR2016/008832, filed on Aug. 11, 2016, and claims priority from and the benefit of Korean Patent Application No. 10-2016-0042798, filed on Apr. 7, 2016, each of which are incorporated by reference for all purposes as if fully set forth herein.

BACKGROUND

Field

One or more embodiments relate to a surveillance system and a control method thereof.

Discussion of the Background

Recently, more cameras have been installed inside and outside of buildings, on streets, and the like for various purposes, such as crime prevention, security, or store management. These cameras may be connected to one another via a wired or wireless network to function as network cameras.

Also, an administrator, who manages locations where cameras are installed, may access the cameras through a personal computer (PC) or the like and remotely manage remote places such as buildings or stores.

One or more embodiments include a surveillance system, which is capable of preventing non-sensing of an event, and a control method of the surveillance system.

SUMMARY

According to one or more embodiments, a surveillance system includes: a communication module configured to communicate with a plurality of network cameras; and a processor configured to recognize a motion of a subject based on event information transmitted by one network camera among the plurality of network cameras and to transmit subject information based on the motion of the subject to the other network cameras.

The processor may be further configured to identify the one network camera based on the event information, to detect at least one network camera located at a certain distance from the one network camera among the plurality of network cameras, and to transmit the subject information to the at least one network camera.

The processor may be further configured to calculate a moving direction of the subject based on an image transmitted by the one network camera and to transmit the subject information including the moving direction of the subject to the other network cameras.

The processor may be further configured to detect at least one network camera located on a path predicted based on the moving direction of the subject and to transmit the subject information to the at least one network camera.

The subject information may include at least one selected from among a panning command, a tilting command, and a zooming command with respect to the moving direction of the subject.

The surveillance system may further include a network interface configured to transmit the event information or the subject information to a monitor terminal via a network.

According to one or more embodiments, a surveillance system includes: a sensor configured to sense an event; a communication module configured to receive subject information based on a motion of a subject; and a processor configured to set an operation mode to a sleep mode in which an event sensing period of the sensor is a first period, and to change the operation mode to a standby mode that is different from the sleep mode.

The standby mode may be an operation mode in which the event sensing period of the sensor is a second period that is shorter than the first period.

The surveillance system may further include a camera module configured to capture an image of a surveillance region, wherein the processor may be further configured to control the camera module to capture the image of the surveillance region when the event is sensed by the sensor or when the subject information is received by the communication module.

The processor may be further configured to control the camera module to capture the image of the surveillance region at a first frame rate when the event is sensed by the sensor, and to control the camera module to capture the image of the surveillance region at a second frame rate that is lower than the first frame rate when the subject information is received by the communication module.

The surveillance system may further include an encoder configured to encode the image captured by the camera module, wherein the processor may be further configured to control the encoder to encode the image at a first compression ratio when the event is sensed by the sensor, and to control the encoder to encode the image at a second compression ratio that is higher than the first compression ratio when the subject information is received by the communication module.

The subject information may include a moving direction of the subject.

The surveillance system may further include a camera module configured to capture an image of a surveillance region and perform at least one selected from among panning, tilting, and zooming, wherein the processor may be further configured to control the camera module to perform at least one selected from among panning, tilting, and zooming with respect to the moving direction of the subject.

According to one or more embodiments, a control method of a surveillance system includes: transmitting, by using a first network camera, event information to a gateway; recognizing, by using the gateway, a motion of a subject based on the event information; and transmitting, by using the gateway, subject information based on the motion of the subject to a second network camera that is different from the first network camera.

The control method may further include, before the gateway transmits the subject information to the second network camera, detecting, by using the gateway, the second network camera located at a certain distance from the first network camera.

The control method may further include, before the gateway transmits the subject information to the second network camera: transmitting, by using the first network camera, an image of a surveillance region to the gateway; calculating, by using the gateway, a moving direction of the subject based on the image of the surveillance region; and detecting, by using the gateway, the second network camera located on a path predicted based on the moving direction of the subject.

The control method may further include performing, by using the second network camera, at least one selected from among panning, tilting, and zooming with respect to the moving direction of the subject, based on the subject information.

The control method may further include reducing, by using the second network camera, an event sensing period based on the subject information.

The control method may further include capturing, by using the second network camera, an image of a surveillance region based on the subject information.

The control method may further include: capturing, by using the second network camera, the image of the surveillance region at a first frame rate based on the subject information; and sensing, by using the second network camera, the subject and capturing the image of the surveillance region at a second frame rate that is higher than the first frame rate.

According to embodiments, costs for operating the surveillance system may be saved by reducing power consumption of the battery that supplies power to the network cameras.

According to embodiments, since the plurality of network cameras operate in preparation for the motion of the subject, the surveillance system is capable of preventing non-sensing of an event.

BRIEF DESCRIPTION OF DRAWINGS

FIG. 5 is a table for describing an operation mode of a network camera, according to an embodiment;

DETAILED DESCRIPTION OF THE ILLUSTRATED EMBODIMENTS

Figure 1:
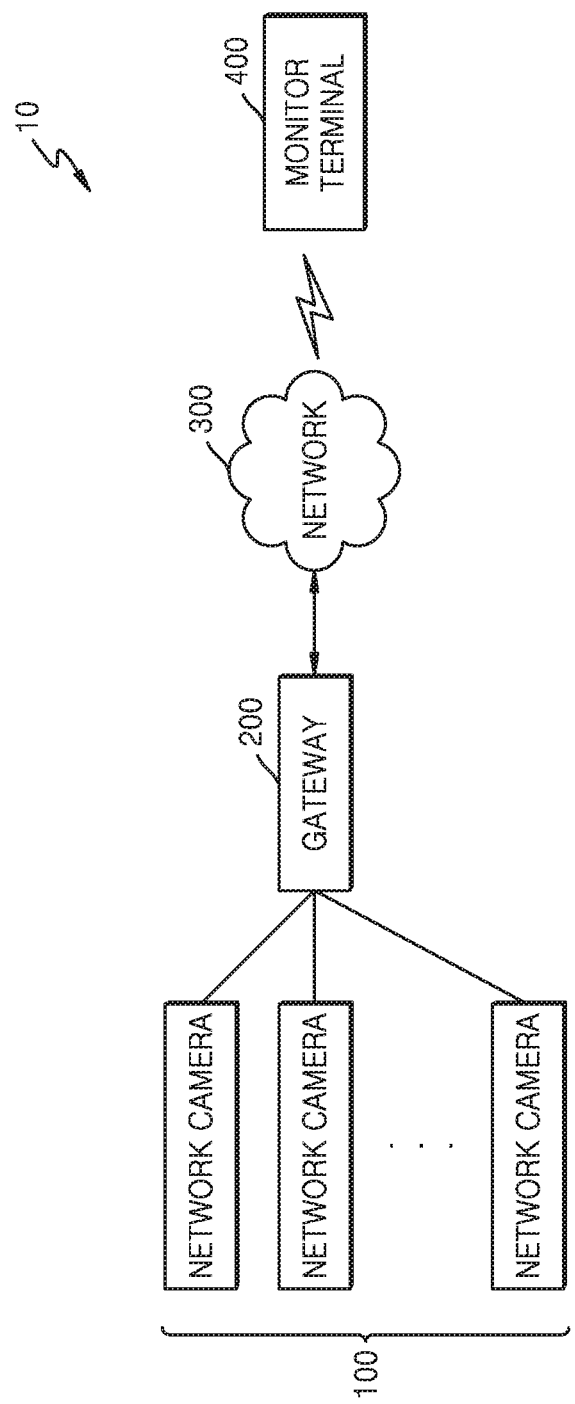
FIG. 1 is a configuration diagram of a surveillance system according to an embodiment.

According to one or more embodiments, a surveillance system includes: a communication module configured to communicate with a plurality of network cameras; and a processor configured to recognize a motion of a subject based on event information transmitted by one network camera among the plurality of network cameras and to transmit subject information based on the motion of the subject to the other network cameras.

Various alterations and modifications may be made to embodiments, some of which will be illustrated in detail in the drawings and detailed description. However, it should be understood that these embodiments are not construed as limited to the illustrated forms and include all changes, equivalents, or alternatives within the idea and the technical scope of the inventive concept. However, in the following descriptions and the accompanying drawings, descriptions of well-known functions and constructions will be omitted if they are considered to unnecessarily obscure the gist of the inventive concept. As used herein, the term "and/or" includes any and all combinations of one or more of the associated listed items.

Hereinafter, embodiments will be described in detail with reference to the accompanying drawings. Like reference numerals are assigned to like elements throughout the drawings and the specification, and redundant descriptions thereof will not be repeated.

FIG. 1 is a configuration diagram of a surveillance system 10 according to an embodiment.

Referring to FIG. 1, the surveillance system 10 may include a network camera 100, a gateway 200, a network 300, and a monitor terminal 400.

When information about the network camera 100, which is collected by the gateway 200, is transmitted to a server (not illustrated) via the network 300, the surveillance system 10 may allow an administrator to monitor the information transmitted to the server (not illustrated) by using the monitor terminal 400.

The network camera 100 may photograph a surveillance region to obtain an image of the surveillance region. The network camera 100 may photograph the surveillance region in real time for surveillance or security purposes. The network camera 100 may be a pan-tilt-zoom (PTZ) camera that is capable of panning and tilting and is capable of adjusting a zoom magnification of a lens. The surveillance system 10 may include one or more network cameras 100.

The network camera 100 may be a low-power camera that is driven by a battery. The low-power camera maintains a sleep mode in a normal mode and periodically wakes up to check whether an event has occurred. When the low-power camera determines that the event has occurred, the low-power camera changes an operation mode to an active mode. When the low-power camera determines that the event has not occurred, the low-power camera returns to the sleep mode. When the low-power camera receives subject information, the low-power camera changes the operation mode to a standby mode, regardless of the occurrence of the event. In this manner, the low-power camera may reduce power consumption by maintaining the standby mode only when the subject information is received and maintaining the active mode only when the low-power camera determines that the event has occurred.

The network camera 100 may communicate with the gateway 200 by using various communication methods, such as wired or wireless local area network (LAN), wireless fidelity (Wi-Fi), ZigBee, Bluetooth, or near field communication (NFC). For example, the network camera 100 may communicate with the gateway 200 in accordance with a low-power wireless communication protocol using a radio frequency of an industrial scientific medical (ISM) band.

The gateway 200 may transmit a command or an alarm to another network camera 100 or the monitor terminal 400 based on the information received from the network camera 100.

The gateway 200 may transmit information to the server (not illustrated) by using various wired or wireless communication methods, such as Ethernet, Wi-Fi, or Bluetooth, and may receive a command from the server (not illustrated).

The network 300 may include a wired network or a wireless network. The wireless network may be a 2nd generation (2G) or 3rd generation (3G) cellular communication system, 3rd Generation Partnership Project (3GPP), a 4th generation (4G) communication system, Long-Term Evolution (LTE), or World Interoperability for Microwave Access (WiMAX).

The monitor terminal 400 may display and store the information received from the server (not illustrated). For example, the monitor terminal 400 may display the alarm received from the server (not illustrated). The monitor terminal 400 may include at least one processor. The monitor terminal 400 may be incorporated in another hardware device, such as a microprocessor or a general-purpose computer system. The monitor terminal 400 may be a personal computer (PC) or a mobile terminal.

Figure 2:
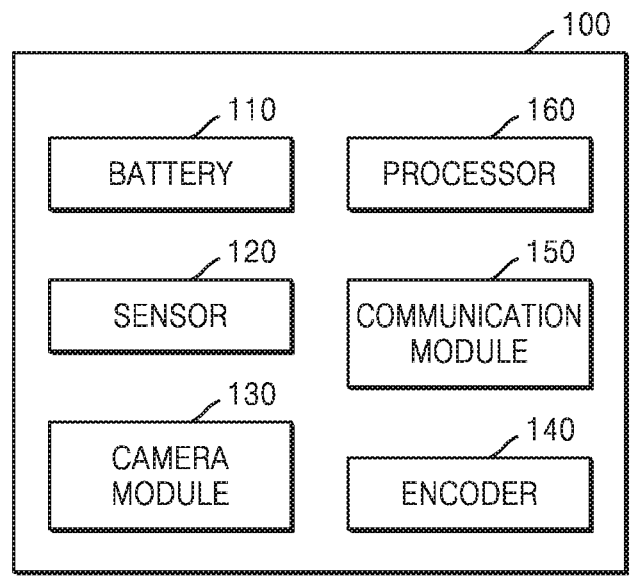
FIG. 2 is a block diagram of a network camera included in the surveillance system of FIG. 1, according to an embodiment.

FIG. 2 is a block diagram of the network camera 100 included in the surveillance system 10 of FIG. 1, according to an embodiment.

Referring to FIG. 2, the network camera 100 may include a battery 110, a sensor 120, a camera module 130, an encoder 140, a communication module 150, and a processor 160.

The battery 110 may supply power to the network camera 100.

For example, when the network camera 100 operates in the sleep mode, the battery 110 may supply power to the sensor 120 and/or the processor 160. When the network camera 100 operates in the active mode, the battery 110 may supply power to the sensor 120, the camera module 130, the encoder 140, the communication module 150, and the processor 160.

According to an embodiment, when the network camera 100 operates in the standby mode, the battery 110 may supply power to the sensor 120 and/or the processor 160. According to another embodiment, when the network camera 100 operates in the standby mode, the battery 110 may supply power to the sensor 120, the camera module 130, the encoder 140, the communication module 150, and the processor 160.

The sensor 120 may sense an event. The sensor 120 may include an infrared sensor, an audio sensor, a motion sensor, a gas sensor, a water leak sensor, a temperature sensor, a humidity sensor, an acceleration sensor, a gyro sensor, a tactile sensor, a pressure sensor, a vibration sensor, and the like.

The camera module 130 may capture an image of a surveillance region. The camera module 130 may capture an image when the network camera 100 operates in the active mode or the standby mode. For example, the camera module 130 may capture an image at a first frame rate when the network camera 100 operates in the active mode, and may capture an image at a second frame rate that is lower than the first frame rate when the network camera 100 operates in the standby mode.

The camera module 130 may be an image sensor, such as a charge-coupled device (CCD) sensor or a complementary metal-oxide semiconductor (CMOS) sensor.

The camera module 130 may change a surveillance region or enlarge an image of a capturing target by panning, tilting, or zooming. For example, when the sensor 120 senses an event, the camera module 130 may change a surveillance region to a region where the event is sensed, or enlarge an image of a capturing target. As another example, when subject information is received, the camera module 130 may change a surveillance region in a moving direction of a subject, or enlarge an image of a capturing target.

The encoder 140 may encode an image acquired by the camera module 130 into a digital signal. For example, the encoder 140 may encode an image at a low compression ratio when the network camera 100 operates in the active mode, and may encode an image at a high compression ratio when the network camera 100 operates in the standby mode.

The communication module 150 may communicate with the gateway 200. For example, the communication module 150 may transmit, to the gateway 200, event information, images, and the like, and may receive, from the gateway 200, event information, subject information, a panning command, a tilting command, and a zooming command with respect to a moving direction of the subject, and the like. The event information may include network camera identification information, an event type, an event sensing point of time, an event duration, and the like. The subject information may include subject identification information, a position of the subject, a moving direction of the subject, a moving speed of the subject, a standby mode change command, and the like.

The communication module 150 may perform a communication function of at least one selected from among a wired or wireless LAN, Wi-Fi, ZigBee, Bluetooth, and NFC.

The processor 160 may control an overall operation of the network camera 100.

The processor 160 may set an operation mode to a sleep mode in which an event sensing period of the sensor 120 is a first period, and may change the operation mode from the sleep mode to the standby mode when subject information is received. The first period, which is the event sensing period of the sensor 120 in the sleep mode, may be, for example, about 250 milliseconds. When the event is sensed, the processor 160 may change the operation mode from the sleep mode or the standby mode to the active mode.

According to an embodiment, the standby mode may mean an operation mode in which the event sensing period of the sensor 120 is a second period that is shorter than the first period. The second period, which is the event sensing period of the sensor 120 in the standby mode, may be, for example, about 10 milliseconds. According to an embodiment, it is possible to cope with the motion of the subject by changing the event sensing period according to the reception or non-reception of the subject information, thus providing an efficient surveillance system capable of preventing non-sensing of an event.

According to another embodiment, the standby mode may mean an operation mode in which the camera module 130 captures an image of a surveillance region. In other words, when the event is sensed through the sensor 120 or when the subject information is received through the communication module 150, the processor 160 may control the camera module 130 to capture the image of the surveillance region.

For example, the processor 160 may control the camera module 130 to capture the image of the surveillance region at a first frame rate when the event is sensed through the sensor 120, and may control the camera module 130 to capture the image of the surveillance region at a second frame rate that is lower than the first frame rate when the subject information is received through the communication module 150. The first frame rate may be, for example, 30 fps (frames per second), and the second frame rate may be, for example, 15 fps.

As another example, the processor 160 may control the encoder 140 to encode an image acquired by the camera module 130 at a first compression ratio when the event is sensed through the sensor 120, and may control the encoder 140 to encode an image acquired by the camera module 130 at a second compression ratio that is higher than the first compression ratio when the subject information is received through the communication module 150. The image encoded at the first compression ratio may have a YUV 4:2:2 format, and the image encoded at the second compression ratio may have a YUV 4:0:0 format.

According to another embodiment, the standby mode may mean an operation mode in which the camera module 130 changes a surveillance region or enlarges an image of a capturing target in a moving direction of the subject. That is, in the standby mode, the processor 160 may control the camera module 130 to perform at least one selected from among panning, tilting, and zooming in the moving direction of the subject.

Figure 3:
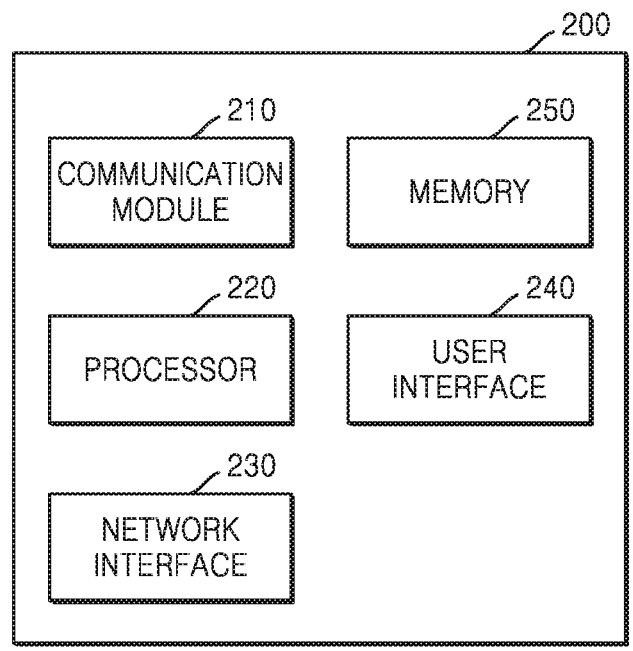
FIG. 3 is a block diagram of a gateway included in the surveillance system of FIG. 1, according to an embodiment.

FIG. 3 is a block diagram of the gateway 200 included in the surveillance system 10 of FIG. 1, according to an embodiment.

Referring to FIG. 3, the gateway 200 may include a communication module 210, a processor 220, a network interface 230, a user interface 240, and a memory 250.

The communication module 210 may communicate with the plurality of network cameras 100. For example, the communication module 210 may receive, from the network cameras 100, event information, images, and the like, and may transmit, to the network cameras 100, event information, subject information, a panning command, a tilting command, and a zooming command with respect to the moving direction of the subject, and the like.

The communication module 210 may communicate with the network cameras 100 by using at least one selected from among a wired or wireless LAN, Wi-Fi, ZigBee, Bluetooth, and NFC.

The processor 220 may control an overall operation of the gateway 200.

The processor 220 may recognize the motion of the subject based on event information transmitted by one of the plurality of network cameras 100 and transmit subject information based on the motion of the subject to the other network cameras 100. Hereinafter, the network camera 100, which transmits the event information to the gateway 200, will be referred to as a first network camera (100A in FIG. 4), and the network camera 100, to which the gateway 200 transmits the subject information, will be referred to as a second network camera (100B in FIG. 4).

The subject information may include subject identification information, a position of the subject, a moving direction of the subject, a moving speed of the subject, a standby mode change command, and the like. The standby mode change command may include an event sensing period change command, a surveillance region photograph command, a surveillance region low-resolution-photograph command, and the like, but is not limited thereto.

Figure 4:
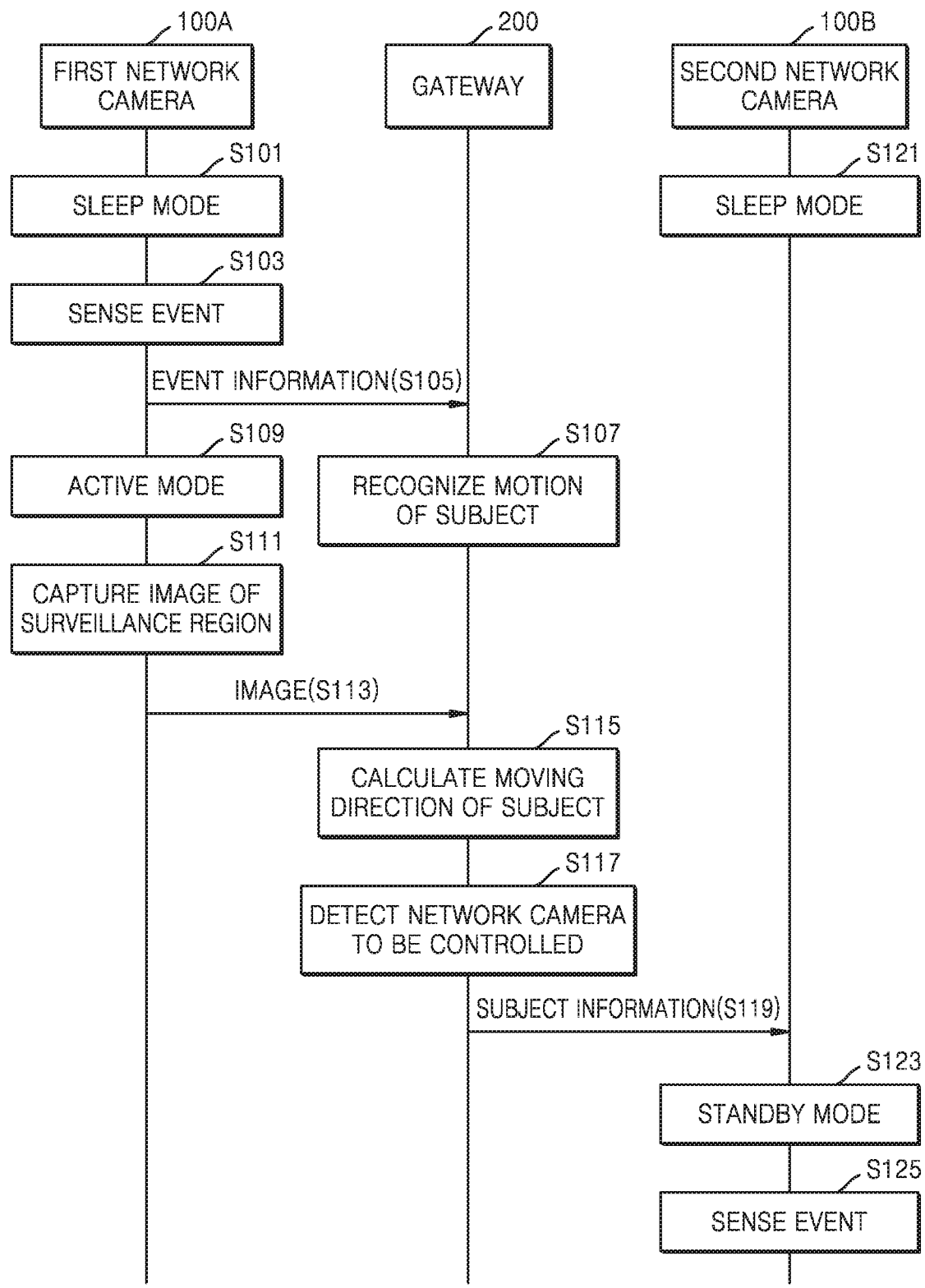
FIG. 4 is a flow diagram of a control method of a surveillance system, according to an embodiment.

According to an embodiment, when the communication module 210 communicates with each of the first network camera (100A in FIG. 4) and the second network camera (100B in FIG. 4), the processor 220 may transmit the subject information to the second network camera (100B in FIG. 4) according to the event information transmitted by the first network camera (100A in FIG. 4).

According to another embodiment, the processor 220 may identify the first network camera (100A in FIG. 4) based on the event information, detect at least one network camera (for example, the second network camera (100B in FIG. 4)) located at a certain distance from the first network camera (100A in FIG. 4) among the plurality of network cameras 100, and transmit the subject information to the second network camera (100B in FIG. 4).

According to another embodiment, when the communication module 210 communicates with each of the first network camera (100A in FIG. 4) and the second network camera (100B in FIG. 4), the processor 220 may calculate the moving direction of the subject based on the image transmitted by the first network camera (100A in FIG. 4), and transmit the subject information including the moving direction of the subject to the second network camera (100B in FIG. 4).

According to another embodiment, the processor 220 may calculate the moving direction of the subject based on the image transmitted by the first network camera (100A in FIG. 4) and predict a path of the subject based on the moving direction of the subject. In this case, the processor 220 may detect the second network camera (100B in FIG. 4) located on the predicted path among the plurality of network cameras 100 and transmit the subject information to the second network camera (100B in FIG. 4). The subject information may include at least one selected from among a panning command, a tilting command, and a zooming command with respect to the moving direction of the subject.

The network interface 230 may connect the gateway 200 to the network 300 so that the gateway 200 connects the network camera 100 to the monitor terminal 400.

According to an embodiment, the network interface 230 may transmit the event information, the subject information, and the like to the monitor terminal 400 via the network 300.

The user interface 240 may be used to control the operation of the gateway 200, to register the network cameras 100 in the gateway 200 or delete the network cameras 100 from the gateway 200, or to control the network cameras 100 through the gateway 200. The user interface 240 may include an input device, such as a touch screen, a keypad, and a microphone, and/or an output device, such as a display, a speaker, and an alarm lamp.

The memory 250 may store the event information and the image received from the network cameras 100. The memory 250 may store the subject information or the like generated by the processor 220.

Hereinafter, a control method of a surveillance system, according to an embodiment, will be described in detail with reference to FIGS. 4 and 5.

FIG. 4 is a flow diagram of a control method of a surveillance system, according to an embodiment.

FIG. 5 is a table for describing an operation mode of a network camera, according to an embodiment.

Referring to FIG. 4, in operation S101, the first network camera 100A may operate in a sleep mode. The main operation of the first network camera 100A in the sleep mode will be described with reference to FIG. 5.

Referring to FIG. 5, in the sleep mode, the first network camera 100A may periodically check for an event at every 250 milliseconds, may not capture and compress an image, and may perform an event sensing alarm operation.

Referring to FIG. 4 again, in operation S103, the first network camera 100A may sense an event through the sensor 120. For example, the first network camera 100A may sense a motion of a subject through a motion sensor. In this case, the first network camera 100A may generate event information. The event information may include identification information of the first network camera 100A, an event type of a motion or the like, a motion sensing point of time, a motion period, and the like.

In operation S105, the first network camera 100A may transmit the event information to the gateway 200 through the communication module 150. In operation S107, the gateway 200 may recognize the motion of the subject based on the event information.

In operation S109, the first network camera 100A may operate in an active mode according to the sensing of the event. Although not illustrated, the first network camera 100A may operate in the active mode according to a user input. The user input may be received through the user interface 240 of the gateway 200 and may be transmitted to the first network camera 100A through the communication module 210.

In operation S111, the first network camera 100A, which operates in the active mode, may capture an image of a surveillance region. Hereinafter, the main operation of the first network camera 100A in the active mode will be described with reference to FIG. 5.

Referring to FIG. 5 again, in the active mode, the first network camera 100A may capture an image at a full frame rate, for example, 30 fps, or may acquire a high-definition image compressed in a YUV 4:2:2 format. In the active mode, the first network camera 100A may stop sensing an event, but embodiments are not limited thereto.

Referring to FIG. 4 again, in operations S113 and S115, when the first network camera 100A transmits the image of the surveillance region to the gateway 200, the gateway 200 may calculate a moving direction of the subject based on the image of the surveillance region.

In operation S117, the gateway 200 may detect the second network camera 100B as a network camera to be controlled.

According to an embodiment, the second network camera 100B may be the other network cameras 100 except for the first network camera 100A among the plurality of network cameras 100 that communicate with the gateway 200.

According to another embodiment, the gateway 200 may detect the second network camera 100B located at a certain distance from the first network camera 100A. That is, the second network camera 100B may be the network cameras 100 located at a predetermined distance from the first network camera 100A among the plurality of network cameras 100.

In operation S119, the gateway 200 may transmit the subject information based on the moving direction of the subject to the second network camera 100B. Although not illustrated, in operation S119, the gateway 200 may transmit a standby mode change command to the second network camera 100B.

In operation S123, the second network camera 100B may change the operation mode from the sleep mode (S121) to the standby mode according to the subject information. Hereinafter, the main operation of the second network camera 100B in the standby mode will be described with reference to FIG. 5.

Referring to FIG. 5 again, in the standby mode, the second network camera 100B may periodically check for an event at every 10 milliseconds, may not capture and compress an image, and may perform an event sensing alarm operation. That is, when the operation mode is changed from the sleep mode to the standby mode, the second network camera 100B may reduce the event sensing period. Since the second network camera 100B operates in preparation for the motion of the subject, the event may be more accurately sensed.

In the standby mode, the second network camera 100B according to another embodiment may capture an image at a half frame rate, for example, 15 fps, or may acquire a low-quality image compressed in a YUV 4:0:0 format. Although not illustrated, in the standby mode, the second network camera 100B according to another embodiment may capture an image at a full frame rate, for example, 30 fps, or may acquire a high-definition image compressed in a YUV 4:2:2 format. Therefore, even though the event is not sensed, if the subject information is received, the second network camera 100B may prepare for occurrence of the event by capturing the image of the surveillance region.

Referring to FIG. 4 again, in operation S125, the second network camera 100B may sense an event through the sensor 120. Although not illustrated, the second network camera 100B may change the operation mode from the standby mode to the active mode according to the sensing of the event. The second network camera 100B, which operates in the active mode, may output the image of the surveillance image captured at 30 fps and may output a low-compression-encoded image having a YUV 4:2:2 format As such, the surveillance system 10 according to embodiments changes the operation mode to the sleep mode, the standby mode, or the active mode according to the operation mode of the network cameras 100, thus saving battery power and preventing non-sensing of an event.

In the following description, descriptions already provided above are omitted or provided briefly.

Figure 6:
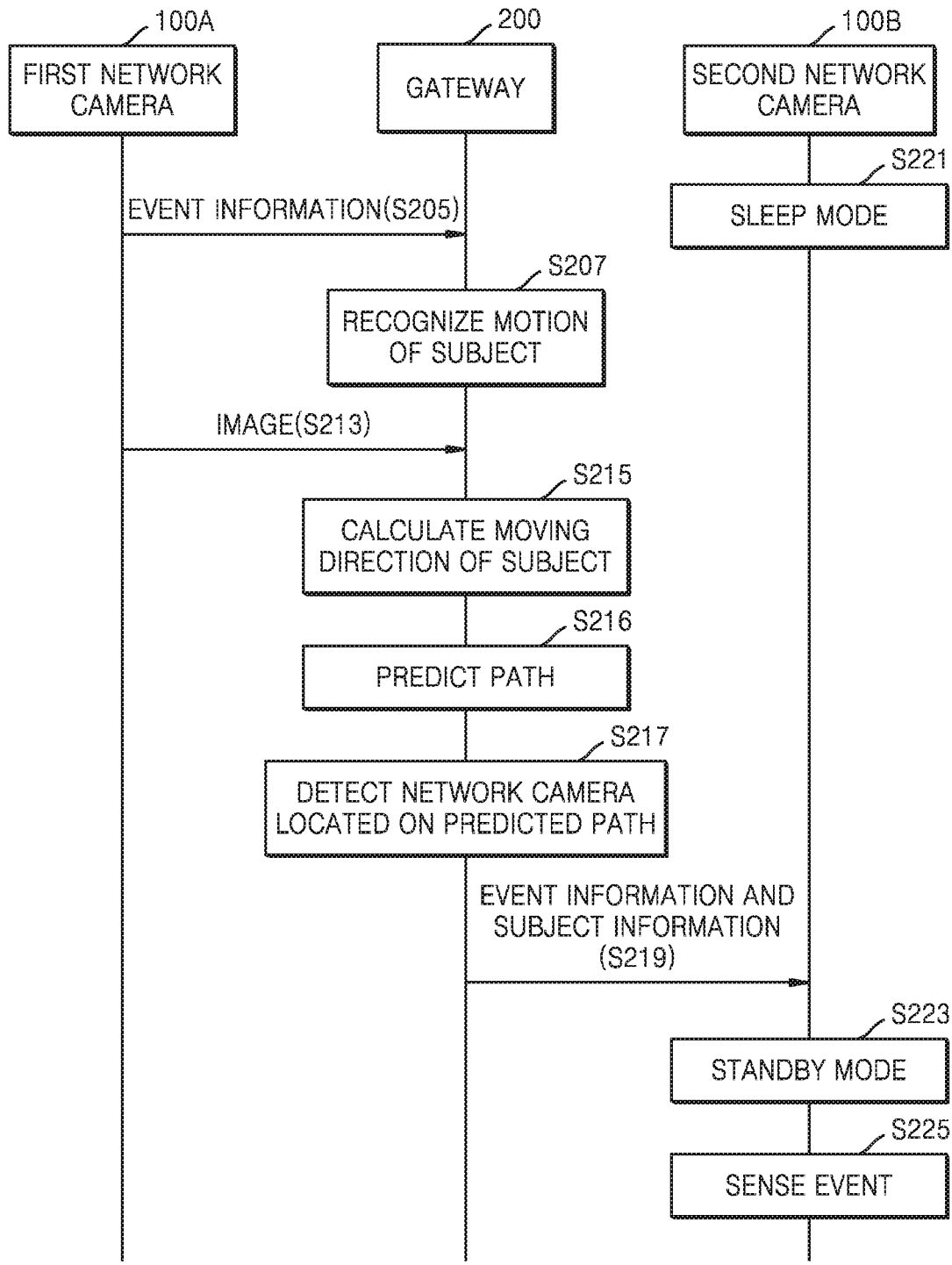
FIG. 6 is a flow diagram of a control method of a surveillance system, according to another embodiment.

FIG. 6 is a flow diagram of a control method of a surveillance system, according to another embodiment.

Referring to FIG. 6, in operation S205, the first network camera 100A may transmit event information to the gateway 200. In operation S207, the gateway 200 may recognize the motion of the subject based on the event information.

In operations S213 to S216, when the first network camera 100A transmits the image of the surveillance region to the gateway 200, the gateway 200 may calculate a moving direction of the subject based on the image of the surveillance region and predict a path of the subject based on the moving direction of the subject.

In operation S217, the gateway 200 may detect the second network camera 100B as a network camera located on the predicted path. The second network camera 100B may be at least one network camera 100 located on the predicted path among the plurality of network cameras 100.

In operation S219, the gateway 200 may transmit the event information and the subject information to the second network camera 100B. Although not illustrated, in operation S219, the gateway 200 may transmit a standby mode change command to the second network camera 100B.

In operation S223, the second network camera 100B may change the operation mode from the sleep mode (S221) to the standby mode according to the event information and the subject information.

In operation S225, the second network camera 100B may sense an event through the sensor 120.

Figure 7:
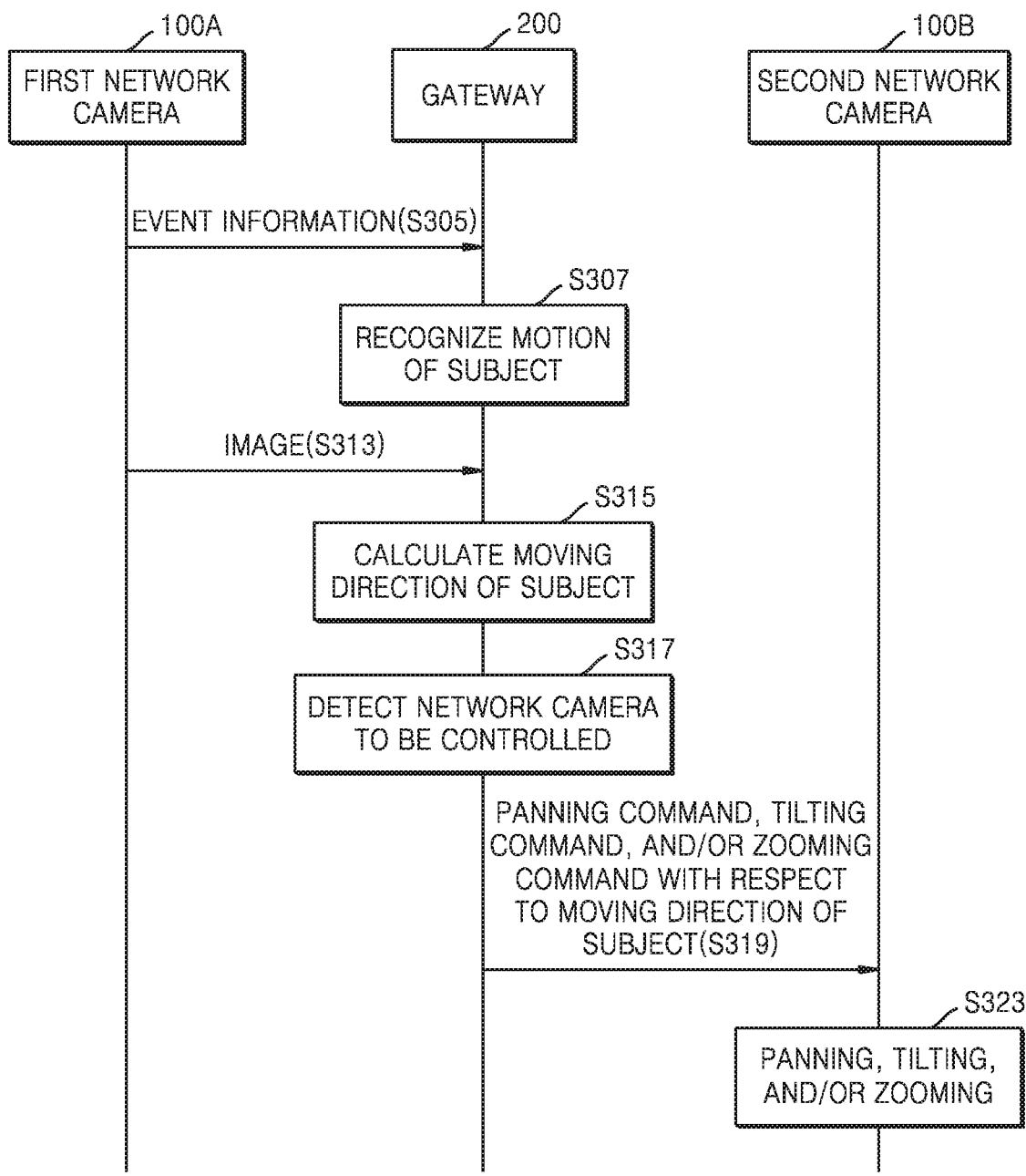
FIG. 7 is a flow diagram of a control method of a surveillance system, according to another embodiment.

FIG. 7 is a flow diagram of a control method of a surveillance system, according to another embodiment.

Referring to FIG. 7, in operation S305, the first network camera 100A may transmit event information to the gateway 200. In operation S307, the gateway 200 may recognize the motion of the subject based on the event information.

In operations S313 and S315, when the first network camera 100A transmits the image of the surveillance region to the gateway 200, the gateway 200 may calculate a moving direction of the subject based on the image of the surveillance region.

In operation S317, the gateway 200 may detect the second network camera 100B as a network camera to be controlled. For example, the second network camera 100B may be the network cameras 100 except for the first network camera 100A among the plurality of network cameras 100. According to another embodiment, the second network camera 100B may be at least one network camera 100 located at a predetermined distance from the first network camera 100A. According to another embodiment, the second network camera 100B may be at least one network camera 100 located on a path predicted based on the moving direction of the subject.

In operation S319, the gateway 200 may transmit, to the second network camera 100B, at least one selected from among a panning command, a tilting command, and a zooming command with respect to the moving direction of the subject. Although not illustrated, in operation S319, the gateway 200 may transmit subject information or a standby mode change command to the second network camera 100B.

In operation S323, the second network camera 100B may perform at least one selected from among panning, tilting, and zooming with respect to the moving direction of the subject in response to operation S319. In this manner, the second network camera 100B may reduce the time for the panning, the tilting, and the zooming at the time of sensing the event by changing the surveillance region to a region that the subject approaches or by enlarging an image of the region that the subject approaches.

Although not illustrated, the second network camera 100B may operate in the sleep mode, the standby mode, or the active mode.

The embodiments set forth herein may be embodied as computer-readable code on a non-transitory computer-readable recording medium. The computer-readable recording medium is any data storage device that can store data which can be thereafter read by a computer system.

Examples of the non-transitory computer-readable recording medium may include ROM, RAM, CD-ROMs, magnetic tapes, floppy disks, and optical data storage devices, and may also include media implemented in the form of carrier wave (e.g., transmission through the Internet). The non-transitory computer-readable recording medium can also be distributed over network-coupled computer systems so that the computer-readable code is stored and executed in a distributed fashion. In addition, functional programs, codes, and code segments for accomplishing the present disclosure can be easily construed by programmers skilled in the art to which the present disclosure pertains.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

The invention claimed is:

1. A surveillance system, comprising:
a first network camera configured to capture an image and detect an event;
a second network camera;
a gateway comprising:
    a communication module configured to communicate with the first network camera and the second network camera; and
    a processor configured to recognize a motion of a subject based on event information transmitted by the first network camera and to transmit subject information generated based on the motion of the subject to the second network camera, wherein:
the second network camera is configured to, based on the subject information received from the gateway, change an operation mode to a standby mode in which the second network camera is configured to acquire a low-quality image;
the second network camera is configured to, based on detecting the event in the standby mode, change the operation mode to an active mode in which the second network camera is configured to acquire a high-quality image;
the subject information comprises at least one selected from among a moving direction of the subject and a moving speed of the subject;
the first or second network camera is configured to capture an image of a surveillance region and perform at least one operation selected from the group consisting of panning, tilting, and zooming; and
the processor is further configured to control the first or second network camera to perform the at least one operation selected from the group consisting of panning, tilting, and zooming with respect to the moving direction of the subject,
wherein the first network camera is configured to, based on detecting the event in a sleep mode, change the operation mode from the sleep mode to the active mode,
wherein the second network camera is configured to, based on the subject information received from the gateway, change the operation mode from the sleep mode to the standby mode, and
wherein an event sensing period to detect the event in the standby mode is shorter than that in the sleep mode.

2. The surveillance system of claim 1, wherein frame rate of the second network camera in the standby mode is lower than the frame rate of the second network camera in the active mode.

3. The surveillance system of claim 2, wherein:
the second network camera comprises an encoder configured to encode the image captured by the second network camera; and
compression ratio of the encoder in the standby mode is higher than the compression ratio of the encoder in the active mode.

4. The surveillance system of claim 1, wherein the gateway is configured to, based on receiving the event information from the first network camera, detect the second network camera that is located within a certain distance from the first network camera, among a plurality of network cameras included in the surveillance system, and transmit the subject information to the detected second network camera.

5. The surveillance system of claim 1, wherein the gateway is configured to, based on receiving the event information from the first network camera, detect the second network camera located on a path predicted based on the moving direction of the subject, and transmit the subject information to the detected second network camera.

* * * * *